(12) United States Patent
Avergun et al.

(10) Patent No.: US 7,496,590 B2
(45) Date of Patent: Feb. 24, 2009

(54) SYSTEM AND METHOD FOR APPLYING DEADBAND FILTERING TO TIME SERIES DATA STREAMS TO BE STORED WITHIN AN INDUSTRIAL PROCESS MANUFACTURING/PRODUCTION DATABASE

(75) Inventors: Mikhail Avergun, San Diego, CA (US); Elliott S. Middleton, Jr., Mission Viejo, CA (US); Hendrik Johannes Victor, Rancho Santa Margarita, CA (US)

(73) Assignee: Invensys Systems, Inc., Foxboro, MA (US)

( * ) Notice: Subject to any disclaimer, the term of this patent is extended or adjusted under 35 U.S.C. 154(b) by 450 days.

(21) Appl. No.: 11/189,353

(22) Filed: Jul. 26, 2005

(65) Prior Publication Data
US 2007/0027888 A1   Feb. 1, 2007

(51) Int. Cl.
G06F 17/00    (2006.01)
G06F 7/00     (2006.01)
G01K 1/02     (2006.01)
(52) U.S. Cl. .................. 707/101; 708/203; 374/142; 374/186
(58) Field of Classification Search .......... 707/101; 708/203; 374/142, 186
See application file for complete search history.

(56) References Cited
U.S. PATENT DOCUMENTS
4,409,670 A * 10/1983 Herndon et al. .............. 701/14
4,604,699 A *  8/1986 Borcherdt et al. ............ 702/15
4,669,097 A *  5/1987 Bristol ....................... 704/200
5,564,285 A * 10/1996 Jurewicz et al. ............ 374/186
5,774,385 A *  6/1998 Bristol ....................... 708/203
6,320,585 B1 * 11/2001 Engel et al. ......... 714/E11.184
6,375,351 B1 *  4/2002 Breunsbach et al. ........ 374/142

OTHER PUBLICATIONS

International Search Report for PCT/US06/28202 dated May 19, 2008.
Written Opinion of International Searching Authority for PCT/US06/28202 dated May 19, 2008.

\* cited by examiner

*Primary Examiner*—Vincent F. Boccio
(74) *Attorney, Agent, or Firm*—Leydig, Voit & Mayer, Ltd.

(57) ABSTRACT

A control system database server is disclosed that includes a data compression facility that implements a compression test sequence on streams of time stamped data points rendered by components of a control system. A deadband/time override is incorporated into the compression test sequence to ensure that a previously received data point, within the stream of received data points, is saved within a designated time period even if the compression test sequence would have determined that the data point be discarded. The series of compressed/tabled data points, corresponding to the received steams of data points, are thereafter provided by the historian to requesting client applications that, by way of example, retrieve the compressed, time stamped data point streams for the purpose of constructing and displaying trend graphs.

19 Claims, 4 Drawing Sheets

SYSTEM AND METHOD FOR APPLYING DEADBAND FILTERING TO TIME SERIES DATA STREAMS TO BE STORED WITHIN AN INDUSTRIAL PROCESS MANUFACTURING/PRODUCTION DATABASE

TECHNICAL FIELD

The present invention generally relates to computing and networked data storage systems, and, more particularly, to techniques for managing (e.g., storing, retrieving, processing, etc.) streams of supervisory control, manufacturing, and production information. Such information is typically rendered and stored in the context of supervising automated processes and/or equipment. The data is thereafter accessed by a variety of database clients such as, for example, by trending applications.

BACKGROUND

Industry increasingly depends upon highly automated data acquisition and control systems to ensure that industrial processes are run efficiently and reliably while lowering their overall production costs. Data acquisition begins when a number of sensors measure aspects of an industrial process and report their measurements back to a data collection and control system. Such measurements come in a wide variety of forms. By way of example the measurements produced by a sensor/recorder include: a temperature, a pressure, a pH, a mass/volume flow of material, a counter of items passing through a particular machine/process, a tallied inventory of packages waiting in a shipping line, cycle completions, etc. Often sophisticated process management and control software examines the incoming data associated with an industrial process, produces status reports and operation summaries, and, in many cases, responds to events/operator instructions by sending commands to actuators/controllers that modify operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial action such as move equipment into and out of service as required.

A very simple and familiar example of a data acquisition and control system is a thermostat-controlled home heating/air conditioning system. A thermometer measures a current temperature, the measurement is compared with a desired temperature range, and, if necessary, commands are sent to a furnace or cooling unit to achieve a desired temperature. Furthermore, a user can program/manually set the controller to have particular setpoint temperatures at certain time intervals of the day.

Typical industrial processes are substantially more complex than the above-described simple thermostat example. In fact, it is not unheard of to have thousands or even tens of thousands of sensors and control elements (e.g., valve actuators) monitoring/controlling all aspects of a multi-stage process within an industrial plant. The amount of data sent for each measurement and the frequency of the measurements varies from sensor to sensor in a system. For accuracy and to facilitate quick notice/response of plant events/upset conditions, some of these sensors update/transmit their measurements several times every second. When multiplied by thousands of sensors/control elements, the volume of data generated by a plant's supervisory process control and plant information system can be very large.

Specialized process control and manufacturing/production information data storage facilities (also referred to as plant historians) have been developed to handle the potentially massive amounts of process/production information generated by the aforementioned systems. An example of such system is the WONDERWARE IndustrialSQL Server historian. A data acquisition service associated with the historian collects time series data from a variety of data sources (e.g., data access servers). The collected data is thereafter deposited with the historian to achieve data access efficiency and querying benefits/capabilities of the historian's relational database. Through its relational database, the historian integrates plant data with event, summary, production and configuration information.

Traditionally, plant databases, referred to as historians, have collected and stored in an organized manner to facilitate efficient retrieval by a database server (i.e., tabled) streams of time stamped data representing process/plant/production status over the course of time. The status data is of value for purposes of maintaining a record of plant performance and presenting/recreating the state of a process or plant equipment at a particular point in time. Over the course of time, even in relatively simple systems, Terabytes of the streaming time stamped information are generated by the system and tabled by the historian.

The tabled information is thereafter retrieved from the tables of historians and displayed by a variety of historian database client applications including trending and analytical applications at a supervisory level of an industrial process control system/enterprise. Such applications include displays for presenting/recreating the changing state of an industrial process or plant equipment at any particular point (or series of points) in time. A specific example of such client application is the WONDERWARE ActiveFactory trending and analysis application. This trending and analysis application provides a flexible set of display and analytical tools for accessing, visualizing and analyzing plant performance/status information.

It is generally desirable to accumulate/record time-series information representative of the current status of an industrial/manufacturing process from many points. The combination of frequent sampling for a large number of points could potentially overwhelm the storage capacity of a historian. At the very least, the presence of such massive volumes of data could potentially slow down access times and render computer hardware prematurely obsolete.

Data point compression can be used to reduce the quantity of stored (and subsequently displayed) data used to create the segments of a line graph in a trending application output. In contrast to averaging (taking the average of a set of samples within a period of time) or filtering (suppressing transient spikes) operations, data compression analyzes the signal of a data stream (i.e., the relationships between the neighboring point values) to abstract the critical aspects from the time-series point values. The abstraction effort is intended to keep the important aspects of the "signal" represented by the time-series point values while reducing the number of stored points. It is noted that the compression technique disclosed herein is intended to compliment, rather than displace, averaging and filtering data reduction techniques.

Techniques have been previously proposed for reducing/compressing the volume of data stored within a historian database. In a first method, described in Bristol, U.S. Pat. No. 4,669,097, a "swinging door" data compression method is disclosed. In the "swinging door" compression method, a set of received data points are used to define a "corridor". In particular, the corridor is defined by an initial reference point, a specified set of offsets and a slope defined by a swinging door algorithm (see, FIG. 3). Upon receiving a first data point falling outside the defined corridor, an endpoint of the corridor is established. The two endpoints of the completed corridor are kept. The received data points falling within the two endpoints of the defined corridor are discarded. The end of a corridor is established when a value is found to be outside the established corridor. At this point the last point within the corridor as well as the first point outside the corridor are recorded, and construction of a new corridor commences with the last point within the completed corridor. The resulting set of saved points representing the trend graph correspond to the endpoints of the corridors. The aim of the Bristol '097 patent is to reduce, through refinement of the corridor definition as subsequent points are received, the overall number of points stored while maintaining a satisfactory record of a trending line segment signal for a time-series set of data points. The swinging door compression algorithm initially disclosed in the Bristol '097 patent was subsequently refined to allow for a variable set of offset values. This variation of the swinging door algorithm was disclosed in Bristol U.S. Pat. No. 5,774,385.

SUMMARY OF THE INVENTION

The known systems can, in some cases, reduce the volume of data for particular points too far. In accordance with the present invention, a historian includes a data compression facility that implements a compression test sequence on streams of data points, wherein each data point includes a value and timestamp, rendered by a control system. A deadband/time override is incorporated into the compression facility to ensure that a previously received data point, within the stream of received data points, is saved within a designated time period even if the compression test sequence would have determined that the data point be discarded. The series of compressed/tabled data points, corresponding to the received steams of data points, are thereafter provided by the historian to requesting client applications that, by way of example, retrieve the compressed, time stamped data point streams for the purpose of constructing and displaying trend graphs. The time override feature potentially improves the degree of similarity between the data point streams received by the historian and the compressed data streams retrieved and displayed by clients of the historian.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
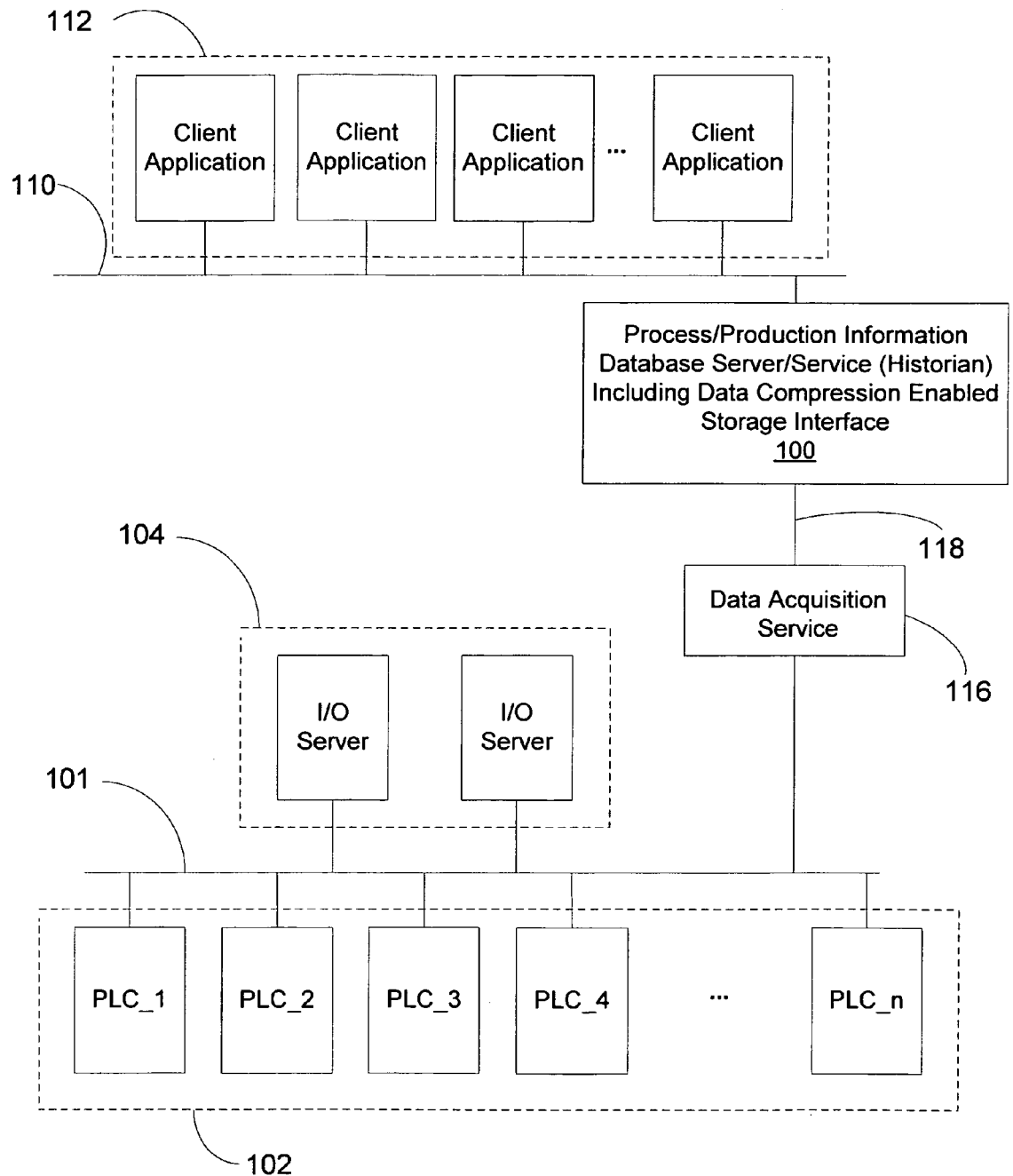
FIG. 1 is a schematic diagram of an exemplary networked environment wherein a process control database server embodying the present invention is advantageously incorporated.

The following description is based on illustrative embodiments of the invention and should not be taken as limiting the invention with regard to alternative embodiments that are not explicitly described herein. Those skilled in the art will readily appreciate that the illustrative example in FIG. 1 represents a simplified configuration used for illustrative purposes. In particular, the systems within which the present invention is incorporated are substantially larger and the breadth of network connections to client applications greater (including clients that access the historian via an Internet portal server). While the illustrative network arrangement depicts a local area network connection between a historian and a set relatively small number of data sources. In many instances, the number of data sources is several times larger—resulting in massive quantities of time-series process data associated with potentially hundreds and even thousands of data points in a process control system. Notwithstanding the recent improvements in secondary storage capacity, reducing the quantity of data, thereby reducing the size of files associated with tabled process data points, potentially improves the performance of the historian and its clients.

FIG. 1 schematically depicts an illustrative environment wherein a supervisory process control and manufacturing/production information data storage facility (also referred to as a plant historian) 100 embodying the present invention is potentially incorporated. The historian 100 includes database services for maintaining and providing a variety of plant/process/production information including historical plant status, configuration, event, and summary information.

The network environment includes a plant floor network 101 to which a set of process control and manufacturing information data sources 102 are connected either directly or indirectly (via any of a variety of networked devices including concentrators, gateways, integrators, interfaces, etc.).

While FIG. 1 illustratively depicts the data sources 102 as a set of PLCs(1-N), the data sources 102 comprise any of a wide variety of data sources (and combinations thereof) including, for example, programmable logic controllers (PLCs), input/output modules, and distributed control systems (DCSs). The data sources 102, in turn, are coupled to, communicate with, and control a variety of devices such as plant floor equipment, sensors, and actuators. Data received from the data sources 102 potentially represents, for example, discrete data such as states, counters, events, etc. and analog process data such as temperatures, tank levels/pressures, volume flow, etc. A set of I/O servers 104, for example DATA ACCESS SERVERS developed and provided by WONDERWARE, acquire data from the data sources 102 via the plant floor network 101 on behalf of a variety of potential clients/subscribers—including the historian 100.

The exemplary network environment includes a production network 110. In the illustrative embodiment the production network 110 comprises a set of client application nodes 112 that execute, by way of example, trending applications that receive and graphically display time-series values for a set of data points. One example of a trending application is WONDERWARE'S ACTIVE FACTORY application software. The data driving the trending applications on the nodes 112 is acquired, by way of example, from the plant historian 100 that also resides on the production network 110. Alternatively, the client applications reside on non-local nodes communicatively connected to the historian 100 via a wide area network link. The links between the historian 100 and client application nodes are therefore potentially slow. Thus, compressing the trending data prior to transmission to the client applications potentially improves the overall responsiveness of the system from the point of view of a non-local user of a trending application.

A data acquisition service 116, for example WONDERWARE's REMOTE IDAS, interposed between the I/O servers 104 and the plant historian 100 operates to maintain a continuous, up-to-date, flow of streaming plant data between the data sources 102 and the historian 100 for plant/production supervisors (both human and automated). The data acquisition service 116 acquires and integrates data (potentially in a variety of forms associated with various protocols) from a variety of sources into a plant information database, including time stamped data entries, incorporated within the historian 100.

The physical connection between the data acquisition service 116 and the I/O servers 104 can take any of a number of forms. For example, the data acquisition service 116 and the I/O servers 104 can comprise distinct nodes on a same network (e.g., the plant floor network 110). However, in alternative embodiments the I/O servers 104 communicate with the data acquisition service 116 via a network link that is separate and distinct from the plant floor network 101. In an illustrative example, the physical network links between the I/O servers 104 and the data acquisition service 116 comprise local area network links (e.g., Ethernet, etc.) that are generally fast, reliable and stable.

The connection between the data acquisition service 116 and the historian 100 can also take any of a variety of forms. In an embodiment of the present invention, the physical connection comprises an intermittent/slow connection 118 that is potentially: too slow to handle a burst of data, unavailable, or faulty. The data acquisition service 116 and/or the historian therefore include components and logic for handling the stream of data from components connected to the plant floor network 101. The data received by the historian 100 are assigned timestamps at the point of acquisition rather than at the time of reception by the historian 100 to ensure the values are properly sequenced. Furthermore, the points of acquisition utilize synchronized clocks (e.g., GPS clock signal) to ensure that all sources of data accurately ascribe timestamps to their data prior to submission to the historian 100 (via the data acquisition service 116).

Figure 2:
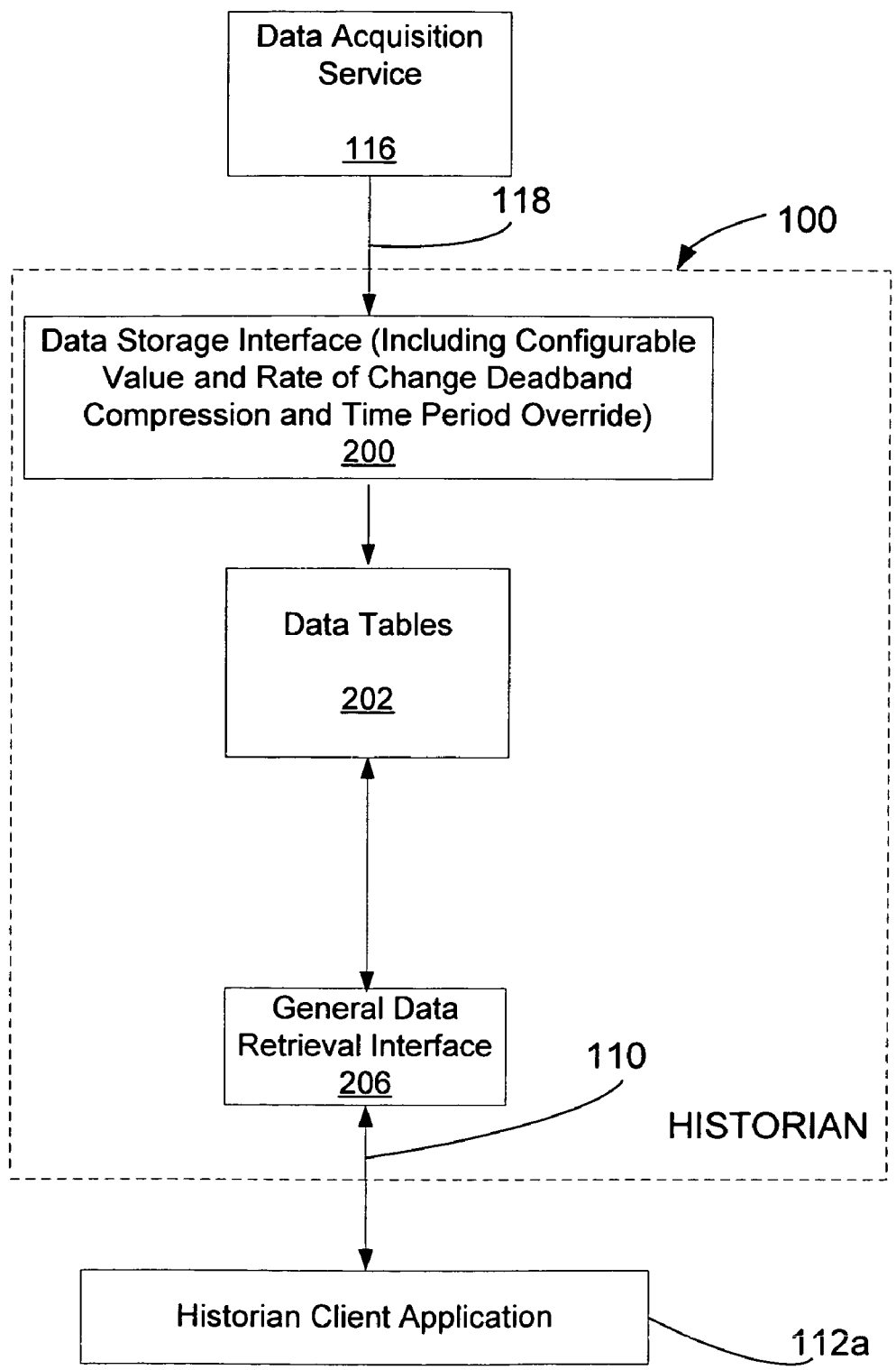
FIG. 2 is a schematic drawing of functional/structural aspects of a historian server/service embodying the present invention.

Turning to FIG. 2 an exemplary schematic diagram depicts functional components associated with the historian 100 and a client application on node 112a. The historian 100 generally implements a storage interface 200 comprising a set of functions/operations for receiving, compressing (see, FIG. 3) and tabling data from the data acquisition service 116 via connection 118. The received data is stored in one or more tables 202 maintained by the historian 100. In addition to compressing data, the historian 100 also potentially averages data (multiple samples within a period of time) and filters data (e.g., rejects transient spikes).

By way of example, the tables 202 include pieces of time stamped time-series data point values received by the historian 100 via a data acquisition interface to a process control/production information network such as the data acquisition service 116 on network 101. In the illustrative embodiment each piece of time-series point data is stored in the form of a value, quality, and timestamp. These three parts to each piece of data stored in the tables 202 of the historian 100 are described briefly herein below.

Timestamps

The historian 100 tables data received from a variety of "real-time" data sources, including the I/O Servers 104 (via the data acquisition service 116). The historian 100 is also capable of accepting "old" data from sources such as text files. By way of example, "real-time" data can be defined to exclude data with timestamps outside of ±30 seconds of a current time of a clock maintained by a computer node hosting the historian 100. However, data characterizing information is also addressable by a quality descriptor associated with the received data. Proper implementation of timestamps requires synchronization of the clocks utilized by the historian 100 and data sources.

Quality

The Historian 100 supports two descriptors of data quality: "QualityDetail" and "Quality." The Quality descriptor is based primarily on the quality of the data presented by the data source, while the QualityDetail descriptor is a simple indicator of "good", "bad" or "doubtful", derived at retrieval-time. Alternatively, the historian 100 supports an OPCQuality descriptor that is intended to be used as a sole data quality indicator that is fully compliant with OPC quality standard(s). In the alternatively embodiment, the QualityDetail descriptor is utilized as an internal data quality indicator.

Value

A value part of a stored piece of data corresponds to a value of a received piece of data. In exceptional cases, the value obtained from a data source is translated into a NULL value at the highest retrieval layer to indicate a special event, such as a data source disconnection. This behavior is closely related to quality, and clients typically leverage knowledge of the rules governing the translation to indicate a lack of data, for example by showing a gap on a trend display.

The following is a brief description of the manner in which the historian 100, with data compression disabled, receives data from a real-time data source and stores the data as a timestamp, quality and value combination in one or more of its tables 202. The operation of a data compression operation built into the storage interface 200 is described herein below with reference to FIGS. 3 and 4.

The historian 100 receives a data point for a particular tag (named data value) via the storage interface 200. The historian compares the timestamp on the received data to: (1) a current time specified by a clock on the node that hosts the historian 100, and (2) a timestamp of a previous data point received for the tag. If the timestamp of the received data point is earlier than, or equal to the current time on the historian node then:

If the timestamp on the received data point is later than the timestamp of the previous point received for the tag, the received point is tabled with the timestamp provided by the real-time data source.

If the timestanp on the received data point is earlier than the timestamp of the previous point received for the tag (i.e. the point is out of sequence), the received point is tabled with the timestamp of the previously tabled data point "plus 5 milliseconds". A special QualityDetail value is stored with the received point to indicate that it is out of sequence (the original quality received from the data source is stored in the "quality" descriptor field for the stored data point).

On the other hand, if the timestamp of the point is later than the current time on the historian 100's node (i.e. the point is in the future), the point is tabled with a timestamp equal to the current time of the historian 100's node. Furthermore, a special value is assigned to the QualityDetail descriptor for the receivedltabled point value to indicate that its specified time was in the future (the original quality received from the data source is stored in the "quality" descriptor field for the stored data point).

The historian 100 can be configured to provide the timestamp for received data identified by a particular tag. After proper designation, the historian 100 recognizes that the tag identified by a received data point belongs to a set of tags for which the historian 100 supplies a timestamp. Thereafter, the timestamp of the point is replaced by the current time of the historian 100's node. A special QualityDetail value is stored for the stored point to indicate that it was time stamped by the historian 100. The original quality received from the data source is stored in the "quality" descriptor field for the stored data point.

As noted in FIG. 2, storage interface 200 of the historian 100 supports application of a configurable value/rate of change deadband compression operation, including a time period override. The compression operation determines whether to store or discard a newly received value (data point) for a particular tag where a value associated with the received data point has not changed sufficiently from a previous stored value for the tag. In an exemplary embodiment, a configuration interface for the historian 100 allows an administrator to determine, for each data stream: (1) whether value deadband compression is enabled (and the magnitude of the value deadband); (2) the magnitude of the rate of change deadband; and (3) whether time period overrides are enabled (and the magnitude of the time periods). The compression stages/steps are illustratively depicted in FIG. 3 described herein below.

Having described a data storage interface for the historian 100, attention is directed to retrieving the stored data from the tables 202 of the historian 100. Access, by clients of the historian 100, to the stored contents of the tables 202 is facilitated by a retrieval interface 206. The retrieval interface 206 exposes a set of functions/operations/methods callable by clients on the network 110 (e.g., client application on node 112a), for querying the contents of the tables 202. In response to receiving a query message, the retrieval interface 206 supplies time-stamped series data to the requesting client application. Thus, the present invention addresses a need to store compressed data in a manner such that the data streams provided to requesting clients reasonably reflect the signal information originally received by the storage interface of the historian 100.

Having described an exemplary functional/structural arrangement for a historian, attention is directed to a flow diagram summarizing the general operation of a time-series data compression operation that abstracts/reduces the content of received data streams corresponding to a set of tracked process control system information points. The abstracted data is thereafter stored within the tables 202 of the historian 100. It is noted that the present invention is not to be limited by the disclosed specific steps and their order of execution. As those skilled in the art will appreciate from the disclosure contained herein, the tests (e.g., rate change deadband, value change deadband, forced store period override, etc.), the points used to carry out the tests, and the resulting actions can be modified in accordance with alternative embodiments of compression operations falling within the scope of the invention. For example, the choice of data points used to calculate a rate change and a change in data point value, for purposes of applying the rate and value deadband tests, differs in alternative embodiments. Furthermore, the order in which the deadband and time-period based tests are performed differ in various embodiments.

The data compression decision steps described herein below rely upon the following three points: a last stored data point, a held over data point, and a received data point. The last stored data point corresponds to the most recent (by timestamp) data point committed to the historian 100's tables 202. The "held over data point" corresponds to the last received data point. The "received data point" corresponds to the data point received by the historian 100 that resulted in the commencement of the steps set forth in FIG. 3.

Figure 3:
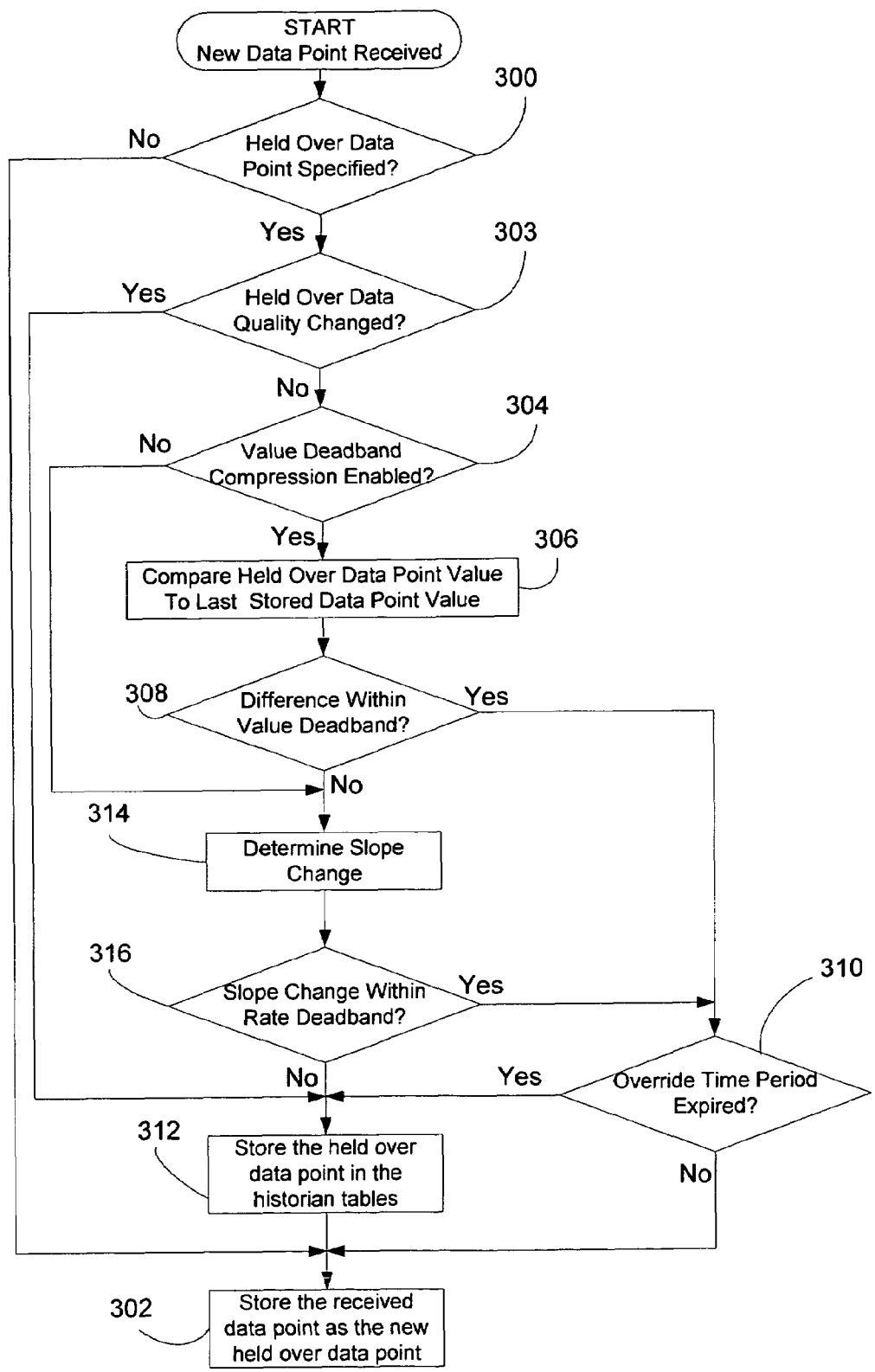
FIG. 3 is a flow diagram depicting the general steps performed by the data compression interface on each received point value when compression is enabled for a steam of time series data point values received by the historian.

The compression operation summarized in FIG. 3, applies two deadbands. First, an optional value deadband ensures that two compared values are sufficiently different. Second, a slope change deadband determines whether a slope has changed sufficiently between two segments defined by at least three distinct previously received points to justify storing an intermediate one of the three points. While known compression algorithms (described above in the discussion of the prior art) apply tests to either store or discard a most recently received data point, it is noted that the compression method described below holds over the most recently received data point until a next data point has been received. Only after a next data point is received do the compression decision steps summarized in FIG. 3 determine whether to store or discard the "held over" data point.

It is noted that a first data point (e.g., the first ever received or first after a previous disconnect), in a stream of data points for a particular tagged process variable, is automatically stored as an initial reference point. The flowchart depicted in FIG. 3 assumes that this value has been stored and the steps address the subsequently received points. Thus for all points received thereafter, the data point stream compression procedure including the steps depicted in FIG. 3 are commenced in response to the historian 100 receiving a new data point specifying a value and timestamp for a particular tagged variable associated with the status/operation of a process control and manufacturing information system.

Thereafter, during step 300, the historian 100 determines whether the held over data point has been specified. If no held over data point presently exists, then control passes from step 300 to step 302. At step 302 the received data point is stored as the held over data point that will be used when a next data point is received by the historian. If the held over data point exists, then control passes to step 303.

In an exemplary embodiment, the historian considers data quality in addition to the value aspect of the held over data point. Therefore, in the illustrative embodiment, at step 303 the historian 100 determines whether the quality assigned the held over data point differs from the quality assigned to a last stored data point. If the data quality has indeed changed, then control passes to step 312 (described further herein below) wherein the held over data point is stored. Otherwise, if the data point quality has not changed, then control passes to step 304.

At step 304 the historian 100 determines whether a value deadband compression function is enabled. The value deadband compression function is driven by a configurable offset magnitude that identifies neighboring points having sufficiently the same magnitude to warrant discarding at least one of the data points (e.g., a subsequently received one of two data points) in a stream of data points for a process variable. If the value deadband compression function is enabled, then control passes to step 306. At step 306, the held over point value is compared to the last stored data point value. The most recently received data point value is not used to perform either step 306 or step 308. Next, at step 308 if the magnitude of the difference between the held over data point value and the last stored data point value is within a deadband offset value, then the held over data point can potentially be discarded (without storing the value in the tables 202) since its value is not sufficiently different from the last stored data point. Therefore, if the difference is within the value deadband, then control passes from step 308 to step 310.

An exemplary embodiment supports specifying a deadband override period that ensures at least one previously held over point value is stored within the specified deadband override period commencing after a last stored data point. At step 310, the historian 100 performs a time period-based deadband override test. The override test carried out during step 310 ensures that excessively long periods of time do not pass between stored points. To ensure that such goals are met, prior to discarding a held over point because it fell within a deadband, at step 310 the historian determines the elapsed time between the last stored data point and the current received data point. If the elapsed time exceeds a specified override time span, then control passes to step 312. At step, 312 the historian 100 stores the held over data point in the tables 202. Control then passes to step 302 wherein the received data point is stored as the held over data point (in preparation for processing a next received data point). If the elapsed time does not exceed the override time period, then control passes from step 310 to step 302.

It is noted that an illustrative embodiment allows the deadband override to be selectively disabled/enabled. If the deadband override is disabled, then all points that fall within specified value/rate deadbands are discarded upon timely receipt of a next data point (which starts the deadband test sequence).

Figure 4:
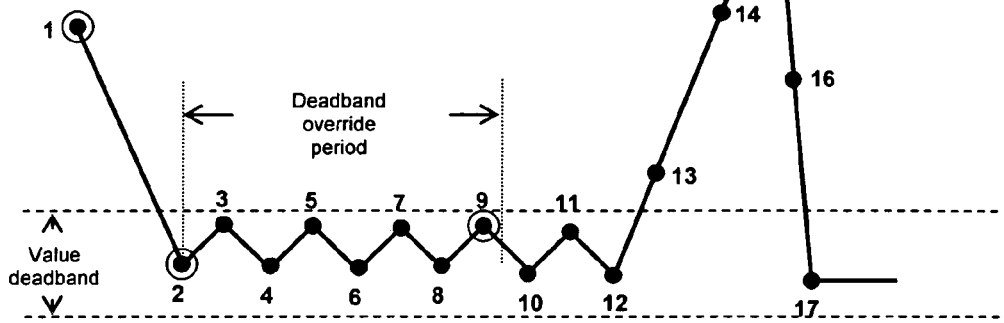
FIG. 4 illustratively depicts a sequence of received values and the effect of the data compression interface, including value and rate deadbands with a deadband override period, on storing the set of received data points.

Turning briefly to FIG. 4, the effect of the override operation of steps 310 and 312 is graphically depicted. After data point 10 is received (and data point 9 is presently the held over data point), during step 310 the historian 100 determines the elapsed time since the last stored point (data point 2) exceeds the specified deadband override period. The held over data point 9 is therefore stored regardless of whether it falls outside either of the value and rate deadbands. A "deadband-overridden" point (e.g., data point 9) is treated no differently than any other stored point. In the example in FIG. 4, once point 9 is stored and point 10 becomes the held over point, subsequent rate calculations use the slope between points 9 and 10 as the baseline for subsequent storage decisions. The deadband override period can have any value, and is not related to a real-time window period (described herein below with reference to FIGS. 5 and 6).

Returning to step 308, if the difference between the last stored value and the held over data point value is not within the specified deadband, then control passes to step 314 wherein a rate of change deadband test commences. In the rate of change deadband test, the slopes of two data segments are compared. In an exemplary embodiment the two data segments are defined by at least: the last stored data point, the held over data point, and the received data point, are compared. If the slopes differ insubstantially, then the held over point—which is located in a time sequence between the last stored value and the received value—can potentially be discarded. If the value deadband test is not enabled, then control passes from step 304 to 314.

Steps 314 and 316 embody an exemplary slope change deadband test (one of many potential alternative tests) for determining whether to store or discard a held over point. During steps 314 and 316 the historian 100 determines whether the slopes of the two compared segments are sufficiently different to warrant storing the held over data point. At step 314, the system determines a difference between a first segment defined by the last stored data point and a first subsequently received/held over data point, and a second segment defined by the current held over data point and the current received data point.

In the illustrative embodiment the slope of the first segment is kept and reused until a new last stored data point is established. Thus, turning briefly to the example set forth in FIG. 5, when data point 1 is stored, the slope between point 1 and point 2 is saved as the "previously stored slope" until point 6 is received. A comparison between the slopes of segment 1-2 and segment 5-6 results in storing data point 5, and the slope between data points 5 and 6 is saved as the "previously stored slope" until a next data point (i.e., data point 10) is stored.

In an alternative embodiment the first segment (utilized during step 314) is updated each time a new held over point is established. This alternative, while potentially consuming more processing cycles (to calculate an updated first segment), potentially provides a better first segment slope for comparing to the second segment slope—which is defined by the held over and received data point values.

There are many ways to specify a slope/rate of change deadband in accordance with alternative embodiments. Returning to FIG. 5 for purposes of describing the application of a rate deadband test, a sequence of received data points is depicted. In the case depicted in FIG. 5, it is assumed that value deadband compression has been disabled. Data point 0 has been stored on disk. Data point 1 is the held over data point. Thereafter, the historian 100 receives data point 2 and calculates a change in slope. In the exemplary embodiment, the change in slope is calculated as a percentage of a previously stored slope. In particular, when data point 2 is received, at step 310 the storage engine calculates the change in slope as follows:

$$Slope0\_1=(Value1-Value0)/(Time1-Time0)$$

$$Slope1\_2=(Value2-Value1)/(Time2-Time1)$$

Test for Slope0_1=0

If Slope0_1=0 then Percent>Rate Deadband else Slope_Change_Percent=|100*(|Slope1_2−Slope0_1|/Slope0_1)|

The above equation for calculating a "slope change percent" presents a potential "divide by zero" error (if slope$0_{1.3}$ 1 equals zero). A conditional is therefore interposed between calculating the slope of the denominator and calculating the slope change percent. If the denominator is zero, then the slope change percent calculation is by-passed (and the slope change is considered sufficient for purposes of the deadband applied during step 316). In an alternative embodiment, the slope change is calculated as a difference (e.g., slope 1—slope 2) rather than a percentage. In yet another, hybrid value/rate deadband embodiment the rate change test is performed by extending/extrapolating a line defined by the last stored data point and held over data point to a time corresponding to the received data point. If a value for a point on the line corresponding to the timestamp of the received data point is sufficiently close to the value of the received data point, then the held over data point is not stored (i.e., the value/rate deadband is not exceeded).

After determining the slope change, control passes from step 314 to step 316 wherein, a rate of change criterion is applied to determine whether the slope change determined during step 314 is within a specified/configurable rate change deadband. By way of example, if the Slope_Change_Percent>Rate_Deadband_Percent (e.g., 10 percent), then the slope has changed sufficiently, and control passes to step 312 wherein the held over data point is stored in the tables 202. Alternatively, instead of a specified percent value, during step 312 the test for determining whether the slope has changed sufficiently comprises comparing a slope difference to a specified slope difference deadband value. In the other proposed hybrid value/rate comparison alternative, where a line segment is extended for the purpose of making a comparison, the change is expressed in actual measurement units On the other hand, if the historian 100 concludes, at step 316 that the slope change determined during step 314 is not sufficiently large (i.e., the change is within the specified deadband), then control passes from step 316 to step 310 (described above) where a time override is applied.

Figure 5:
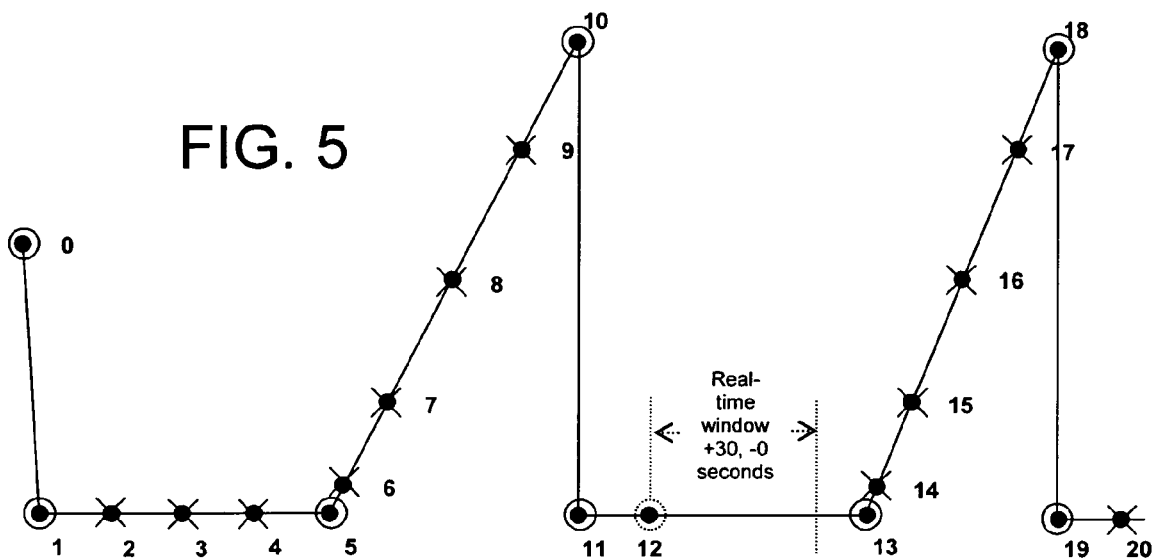
FIG. 5 illustratively depicts a sequence of received values and the effect of the data compression interface, including a rate deadband and real-time window, on storing the set of received data points.

With further reference to FIG. 5, it is noted that with regard to the subsequently received points after point 2, the slope (that is assumed not to be zero for purposes of this example/discussion) has not changed between points 2 through 5, and therefore as points 2 through 5 are received and processed, none of these points are stored in the tables 202 as a result of the test performed during step 316. It is noted that if the slope was indeed zero, then each of the intervening points would have been stored due to the divide by zero condition. However, when point 5 has been designated as the held over point and data point 6 is received, the rate deadband criterion is satisfied (slope change between points 1-2 and points 5-6 is greater than the specified rate deadband), and point 5 is stored on disk. Point 6 is subsequently discarded because the slopes between the two line segments defined by data points 5, 6 and 7 are not substantially different. The next point where the slope changes significantly is at the segment defined by points 10 and 11. After point 11 has been received, during step 314 the slopes of the segment 5/6 and segment 10/11 are used to determine the slope change. Thereafter, at step 316 the historian 100 determines that the slope differences indeed fall outside the rate deadband. Control thereafter passes to step 312 wherein the held over data point 10 is stored. Control then passes to step 302 wherein the received data point 11 is stored as the new held over data point.

It is noted that the disclosed set of data compression steps can be, and indeed are, supplemented by a real-time period timer-based forced storage procedure. Such procedure, described herein below with reference to FIGS. 5 and 6, causes a held over data point to be stored even though a subsequent data point has not yet been received. Such forced storage period is preferably set at a value that is less than a time period used to designate a received data point as "real-time". An example of such a period is 30 seconds.

Figure 6:
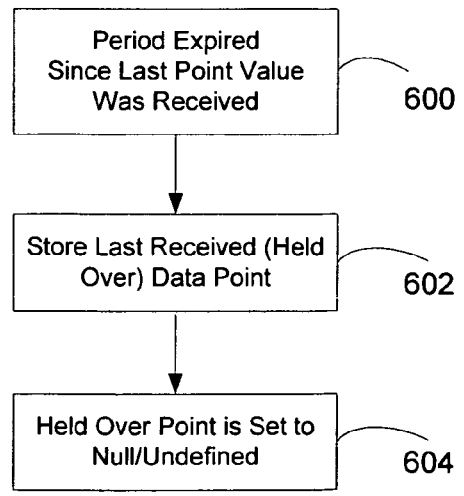
FIG. 6 is a flowchart summarizing a real-time forced storage window method.

Turning to FIG. 6, a flowchart summarizes a set of steps for applying a real-time window forced storage requirement to a stream of received data points for a particular tagged variable. In contrast to the deadband forced storage period, the real-time window begins at the time specified on a timestamp for a held over data point. Upon expiration of the time period at step 600, control passes to step 602. At step 602 the historian stores the previously received/held over data point. Next, at step 604, the held over data point is specified as Null/Undefined. Thus, when a next data point is received, the historian 100, applying the steps summarized in FIG. 3, will determine that there is no presently specified held over point and therefore by-pass the deadband tests. The received point is merely stored as the new held over data point.

Referring to FIG. 5, for purposes of illustrating the effect of the "real-time" window timer, data point 13 illustrates the effect of the real-time window setting. Under normal circumstances, data point 12 would not qualify for being stored. If, however, the elapsed time between the timestamp specified for received data point 12 and data point 13 exceeds the time period window in which the historian 100 is able to store data point 12 as a real-time point (e.g., the specified real-time window is 30 seconds and the elapsed time between points 12 and 13 is greater than 30 seconds), data point 12 is stored anyway. Furthermore, a system tag counting "extra" points stored as a result of an insufficient real-time window is incremented. In other words, if while waiting for data point 13 to arrive, the timestamp of data point 12 becomes so old that it reaches the limit of the real-time window, then data point 12 is stored without consideration of the tests set forth in FIG. 3.

In view of the many possible embodiments to which the principles of this invention may be applied, it should be recognized that the embodiments described herein with respect to the drawing figures, as well as the described alternatives, are meant to be illustrative only and should not be taken as limiting the scope of the invention. The functional components disclosed herein can be incorporated into a variety of programmed computer systems in the form of software, firmware, and/or hardware. Furthermore, the illustrative steps may be modified, supplemented and/or reordered without deviating from the invention. Therefore, the invention as described herein contemplates all such embodiments as may come within the scope of the following claims and equivalents thereof.

What is claimed is:

1. A database server compression and storage facility that operates upon a stream of data points received from a data source in a control environment, to reduce the volume of data points that are stored in a database, wherein each data point specifies a value and timestamp, by discarding received data points that do not significantly depart from a signal trend established by a sequence of received data points from the streaming time stamped data source, a database server compression and storage facility comprising:

a database a compression test sequence applied, upon receiving a new data point, to at least the received new data point, a held over data point and a last data point stored in the database; and a time override that forces storing a candidate data point without regard to whether the candidate point would be stored as a result of applying the compression test sequence, upon receiving the new data points;

wherein the candidate data point is the held over data point; and wherein the time override further comprises a real-time window timer that measures an elapsed period after the time stamp of the held over point and stores the held over data point in the database in response to a specified period, measured by the real-time window timer, expiring.

2. The data compression and storage facility of claim 1 wherein the time override comprises an operation that determines an elapsed time between the last stored data point and the new data point and stores the held over data point in the database if the elapsed time exceeds a specified override time period.

3. The data compression and storage facility of claim 1 wherein the compression test sequence comprises a value deadband test that is applied to the held over data point and the last stored data point.

4. The data compression and storage facility of claim 1 wherein the compression test sequence comprises a rate deadband test that is applied to at least the last stored data point, the held over data point, and the new data point.

5. The data compression and storage facility of claim 4 wherein the rate deadband test comprises determining a change in slope between a first line segment and a second line segment, wherein the first line segment includes at least the last stored data point, and the second line segment includes the new data point and the held over data point.

6. The data compression and storage facility of claim 5 wherein the first line segment further comprises the held over data point.

7. The data compression and storage facility of claim 1 further comprising a quality change test wherein the held over data point is stored if a quality assigned to the held over data point differs from the quality assigned to the last stored data point.

8. In a control environment, a data compression method for reducing the volume of time stamped data points, received from a streaming data source, that are stored in a database, by discarding received data points that do not significantly depart from a signal trend established by a sequence of received data points from the streaming data source, the method comprising:
  providing a compression test sequence that is applied, upon receiving a new data point, to at least the received data point, a held over data point and a last data point stored in the database;
  receiving the new data point after the held over data point and the last stored data point, and in response performing the further steps of:
    executing the compression test sequence; and
    applying a time override to force storage of a candidate data point that would otherwise be discarded as a result of the executing step;
  wherein the candidate data point is the held over data point; and
  wherein the applying step comprises measuring, by a real-time window timer, an elapsed period after the time stamp of the held over point and storing the held over data point in the database in response to a specified period, measured by the real-time window timer, expiring.

9. The data compression method of claim 8 wherein the applying step comprises determining an elapsed time between the last stored data point and the new data point and storing the held over data point in the database if the elapsed time exceeds a specified override time period.

10. The data compression method of claim 8 wherein the executing the compression test sequence step comprises performing a value deadband test that is applied to the held over data point and the last stored data point.

11. The data compression method of claim 8 wherein the executing the compression test sequence step comprises performing a rate deadband test that is applied to at least the last stored data point, the held over data point, and the new data point.

12. The data compression method of claim 11 wherein the rate deadband test comprises determining a change in slope between a first line segment and a second line segment, wherein the first line segment includes at least the last stored data point, and the second line segment includes the new data point and the held over data point.

13. The data compression method of claim 12 wherein the first line segment further comprises the held over data point.

14. A computer-readable medium containing computer-executable instructions for facilitating performing, in a control environment, a data compression method for reducing the volume of time stamped data points, received from a streaming data source, that are stored in a database, by discarding received data points that do not significantly depart from a signal trend established by a sequence of received data points from the streaming data source, the computer-executable instructions facilitating performing the method comprising:
  providing a compression test sequence that is applied, upon receiving a new data point, to at least the received data point, a held over data point and a last data point stored in the database;
  receiving the new data point after the held over data point and the last stored data point, and in response performing the further steps of:
    executing the compression test sequence; and
    applying a time override to force storage of a candidate data point that would otherwise be discarded as a result of the executing step;
  wherein the candidate data point is the held over data point; and
  wherein the applying step comprises measuring, by a real-time window timer, an elapsed period after the time stamp of the held over point and storing the held over data point in the database in response to a specified period, measured by the real-time window timer, expiring.

15. The computer-readable medium of claim 14 wherein the applying step comprises determining an elapsed time between the last stored data point and the new data point and storing the held over data point in the database if the elapsed time exceeds a specified override time period.

16. The computer-readable medium of claim 14 wherein the executing the compression test sequence step comprises performing a value deadband test that is applied to the held over data point and the last stored data point.

17. The computer-readable medium of claim 14 wherein the executing the compression test sequence step comprises performing a rate deadband test that is applied to at least the last stored data point, the held over data point, and the new data point.

18. The computer-readable medium of claim 17 wherein the rate deadband test comprises determining a change in slope between a first line segment and a second line segment, wherein the first line segment includes at least the last stored data point, and the second line segment includes the new data point and the held over data point.

19. The computer-readable medium of claim 18 wherein the first line segment further comprises the held over data point.

* * * * *